United States Patent Office 2,776,514
Patented Jan. 8, 1957

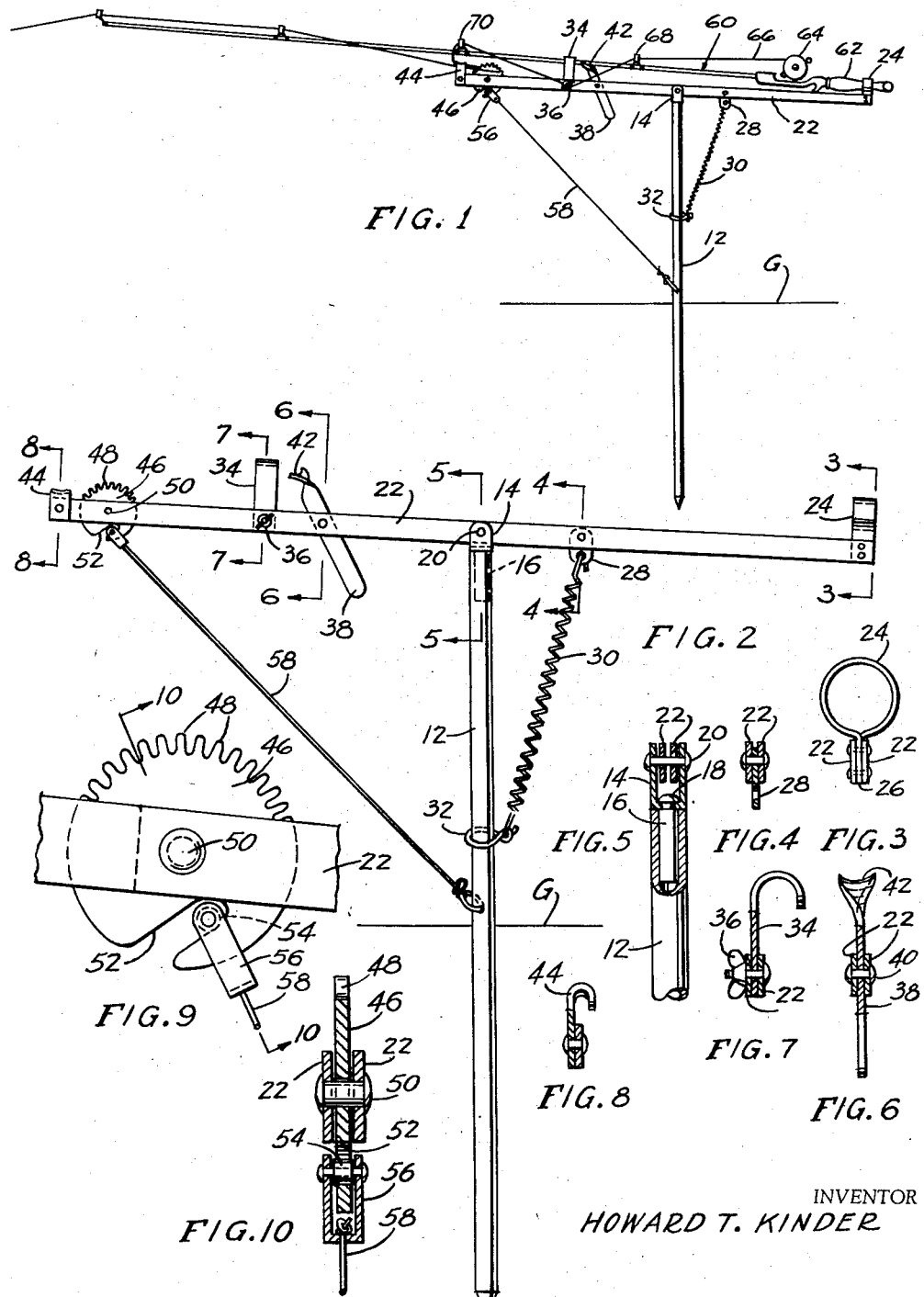

2,776,514
FISHING ROD HOLDER
Howard T. Kinder, Goodland, Kans.
Application September 10, 1954, Serial No. 455,216
2 Claims. (Cl. 43—16)

The present invention, a fishing rod holder of the type having fish-actuated triggering means for imparting a snap action to the rod in order to set the hook, may be summarized briefly as including a vertically swinging, rod-supporting frame spring-biased to swing upwardly. This is normally held against said upward swinging movement by a triggering mechanism including a toothed wheel rotatably mounted on the frame and adapted to engage the fishing line. A yoke is normally attached to said wheel, and a cord is connected between the yoke and a frame-supporting standard. The wheel is rotated by pull exerted by the fish to an extent sufficient to disengage the yoke from the wheel, thereby releasing the frame for its upward swinging movement.

Among important objects of the invention are to provide an improved triggering mechanism in which said wheel and yoke will be incorporated, with the circumferential series of teeth on the wheel being adapted for adjustable snubbing of the line thereabout when the device is being set.

Another object is to provide an improved means for clamping the fishing rod to the associated swingable frame, which means will facilitate the quick removal of the rod when the hook has been set and the fisherman desires to reel in or play the fish.

Other objects will appear from the following description, the claims appended thereto, and from the annexed drawing, in which like reference characters designate like parts throughout the several views, and wherein:

Figure 1 is a side elevational view of a rod holding device formed in accordance with the present invention, operatively associated with a fishing rod, Figure 2 is an enlarged side elevational view of the holder per se, Figures 3 through 8 are sectional views on lines 3—3, 4—4, 5—5, 6—6, 7—7, and 8—8 respectively of Figure 2, Figure 9 is an enlarged, fragmentary side elevational view of the holder illustrating the trip wheel, and Figure 10 is a sectional view on line 10—10 of Figure 9.

To the upper end of a vertical standard 12 having a pointed lower end adapted to penetrate the ground G, there is swivelly connected a U-shaped hinge bracket 14. The swivel connection is shown in Figure 5, and includes a stud 16 seated in the upper end of the tubularly formed standard 12, and a connecting pin 18 extending into an axial opening in the stud through a registering opening formed in the bight of the bracket 14, thus to swivelly mount the bracket on the standard.

A cross pin 20, extending between the legs of the bracket, extends through transversely aligned openings formed in the intermediate portions of elongated, flat arm members 22, thus mounting said arm members upon the post for vertical swinging movement, in each position to which the bracket may rotate. Arm members 22 are fixedly connected at spaced locations along their length, and together comprise a vertically swingable frame.

An upstanding eye 24, lying in a plane normal to the length of the frame, has a depending tongue 26 riveted to and between the rear arms members 22 (Figure 3).

Between the pivot axis 20 of the frame and the eye 24, but closer to said pivot axis than to the eye, there is connected to and between the arm members a plate 28 depending below the arm members and having its depending portion formed with an opening in which is hooked one end of a contractile spring 30, the spring being inclined slightly from the vertical and being connected at its lower end to an S-hook 32 engageable about the standard 12 at many of various locations along the length of the standards. The vertical adjustment of the S-hook is adapted to permit adjustment of the spring tension.

Spring 30, tending to contract, exerts a continuous downward pull upon the rear end of the medially fulcrumed frame, thus tending to swing the front end of the frame, shown at the left in Figures 1 and 2, upwardly.

Approximately midway between the pivot axis 20 and the front end of the frame, an upstanding rod-clamping hook 34 (Figure 7) is provided. This is of inverted J-shape, having a straight shank connected to and between arm members 22 by a transverse bolt to which is threadedly connected a wing nut 36.

Close to the hook element 34, between said hook element and the pivot axis 20, a clamping lever 38 is pivotally connected by a pin 40 (Figure 6) medially between its ends, to and between the arm members 22. The upper end of the lever is axially twisted and is arcuately indented, so as to form an arcuate seat extending transversely of the frame adjacent the upper end of the hook elements 34.

To the front end of the frame there is riveted or otherwise fixedly attached (Figure 3) a guide member 44 of inverted J-shape. In closely spaced relation to the member 44 a wheel 46 is rotatably mounted upon and between the arm members 22. Through part of its periphery the wheel is formed with a circumferentially extending series of teeth 48. The teeth are rounded to prevent catching of a line thereupon, and preferably are of substantial length to insure against accidental disengagement of the line from a selected tooth.

The trip wheel 46 is rotatably mounted upon a stub axle 50 extending between the arm members 22. At a location diametrically opposite the series of teeth 48, the wheel is formed (Figures 9 and 10) with a deep notch 52 extending chordally of the wheel. Engageable in the notch is a catch assembly including a freely rotatable roller 54 journalled upon and between the upstanding arms of a U-shaped yoke 56, to the bight of which is connected one end of a cord 58, the other end of which is connected to the standard 12 at a location well below the upper end of the standard.

The notch 52 declines in the direction of its outer end, toward the front of the frame, when the device is in its set, unreleased position as shown in Figures 1, 2, and 9. In this position of the trip wheel, the roller 54 is engaged in the inner end of the notch, and as a result, the frame will be held against its swinging movement under the pull of spring 30. In this position of the frame, it is inclined only slightly from the horizontal, and is adapted to support in a corresponding, approximately horizontal position a fishing rod generally designated 60. The rod is completely conventional, and includes a butt 62 extendable into the eye 24. From the reel 64 extends the line 66, through first and second grommets or line guides 68, 70 of the rod.

The rod, forwardly of the wheel, is engaged under the hook element 34, after which the clamping lever 38 is grasped at its lower end and is rotated in a clockwise direction about its pivot axis, viewing the lever as in Figures 1 and 2. This causes the seat 42 of the lever to engage against the underside of the rod, thus biasing the rod upwardly into engagement with the bight portion of the hook element 34. The clamping lever wedges in position, and thus the rod is firmly clamped to the frame. Of course, when the rod is to be removed from the frame, it can be removed with a minimum loss of time, should the fisherman desire to play the fish. To remove the rod, one merely strikes the lower end of the lever 38, to swing it in a counterclockwise direction. This releases the rod from its clamped engagement with the hook 34, thus permitting the rod to be moved out from under the hook and pulled out of the eye 24.

With the rod clamped to the frame in the manner described above, the user snubs that portion of the line that extends between guides 68, 70 about the wing nut 36. Then, the user extends that portion of the line immediately in front of the guide 70 under the guide member 44, pulling the line rearwardly and engaging it about a selected one of the teeth 48. After extending the line about said tooth, the user extends the line forwardly, through the guide member 44 and the line is then extended out through the remaining guides of the rod in the regular manner as shown in Figure 1. The frame, meanwhile, will have been engaged in its downwardly swung, set position.

When a fish takes the bait, and exerts a pull on the line, said pull will be effective to rotate the wheel 46 counterclockwise in Figures 1, 2, and 9. This causes the roller 54 to move out of the notch 52. The frame is thus released, and the spring 30, now free to contract, imparts a snap action to the frame and the supported rod, swinging the front end of the frame and of the rod upwardly in a jerking movement, that is effective to set the hook in the fish's mouth. Meanwhile, the line, due to the rotation of the trip wheel, will disengage from the selected tooth, and the fisherman need only, on seeing that a fish has been hooked, disengage the line manually from the wing nut 36. The rod is then removed in the manner previously described, and the fish is played and brought in.

The arrangement shown, as may be noted from Figure 9, permits the user to extend the line about any one of a substantial number of the teeth 48. As a result, an adjustable setting of the triggering mechanism is achieved, which will permit one to initially rotate the trip wheel to any desired position relative to the catch and its associated roller 54, before engaging the line about a tooth.

In other words, the line would normally be engaged about a tooth to the right of the center 50 of the wheel, as shown in Figure 1. The roller 54 need not necessarily be disposed at the inner end of the notch 52. Instead, the roller can be disposed medially between the opposite ends of the notch, or, in fact, close to the open end of the notch. This is achieved by rotating of the trip wheel to selected locations prior to extension of the line about a tooth 48. In each position to which the wheel is rotated to adjustably locate the roller 54, there will be a tooth 48 properly located for snubbing of the line thereabout. Further, the arrangement of the circumferentially extending series of teeth on the trip wheel permits the lines to be connected to the wheel closer to the guide member 44 if desired, thereby to disengage the line from the wheel more readily and quickly than would be true where the line is connected at the location shown in Figure 1 to the trip wheel.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A holder for a fishing rod having a line associated therewith, said holder comprising a standard, a frame vertically swinging thereon, spring means connected between the frame and standard and biasing one end of the frame in one direction, and means on the frame for supporting a fishing rod thereupon, a trigger-and-catch mechanism for normally holding the frame against swinging movement in said direction and responding to a pull exerted on the line by a fish to release the frame for said movement, said trigger and catch mechanism comprising a trip wheel adapted to be rotatably mounted on the frame and formed with a series of teeth extending circumferentially therearound for engagement of a selected tooth by the line to effect rotation of the wheel in one direction by the pull of a fish on the line, said wheel having a notch extending chordally of the wheel approximately diametrically opposite said series of teeth, and a yoke releasably engaged in said notch, for movement out of the notch responsive to rotation of the wheel, thus to disconnect the wheel from the yoke when the wheel is rotated, the yoke having a cord adapted to be connected to the standard to normally hold the frame against said movement when the yoke is engaged in the notch said circumferential series of teeth being adapted to permit preliminary rotatable adjustment of the wheel relative to the yoke for disposition of the yoke a selected adjusted distance from the open end of the notch preliminary to engagement of the line about a selected tooth.

2. A holder for a fishing rod having a line associated therewith, said holder comprising a standard, a frame vertically swinging thereon, spring means connected between the frame and standard and biasing one end of the frame in one direction, and means on the frame for supporting a fishing rod thereupon, a trigger-and-catch mechanism normally holding the frame against swinging movement in said direction and responding to a pull exerted on the line by a fish to release the frame for said movement, said trigger and catch mechanism comprising a trip wheel adapted to be rotatably mounted on the frame and formed with a series of teeth extending circumferentially therearound for engagement of a selected tooth by the line to effect rotation of the wheel in one direction by the pull of a fish on the line, said wheel having a notch extending chordally of the wheel approximately diametrically opposite said series of teeth, and a yoke releasably engaged in said notch, for movement out of the notch responsive to rotation of the wheel, thus to disconnect the wheel from the yoke when the wheel is rotated, the yoke having a cord adapted to be connected to the standard to normally hold the frame against said movement when the yoke is engaged in the notch, the yoke including a roller extending across the notch and rollably engaged against one edge thereof, said circumferential series of teeth being adapted to permit preliminary rotatable adjustment of the wheel relative to the roller, for disposition of the roller a selected, adjusted distance from the open end of the notch preliminary to engagement of the line about a selected tooth.

References Cited in the file of this patent

UNITED STATES PATENTS

| | | |
|---|---|---|
| 891,044 | Darnell et al. | June 16, 1908 |
| 1,957,853 | Sibley | May 8, 1934 |
| 2,578,887 | Jackson et al. | Dec. 18, 1951 |